June 23, 1970  HUGH L. DRYDEN, DEPUTY  3,517,328
ADMINISTRATOR OF THE NATIONAL AERONAUTICS
AND SPACE ADMINISTRATION
METHOD AND APPARATUS FOR STABILIZING A GASEOUS OPTICAL MASER
Filed Oct. 24, 1965  4 Sheets-Sheet 1

INVENTORS
Ali Javan
Koichi Shimoda

BY
ATTORNEYS

June 23, 1970

HUGH L. DRYDEN, DEPUTY
ADMINISTRATOR OF THE NATIONAL AERONAUTICS
AND SPACE ADMINISTRATION
METHOD AND APPARATUS FOR STABILIZING A GASEOUS OPTICAL MASER 3,517,328

Filed Oct. 24, 1965

INVENTORS
Ali Javan
Koichi Shimoda

BY

ATTORNEYS

3,517,328
METHOD AND APPARATUS FOR STABILIZING A GASEOUS OPTICAL MASER
Hugh L. Dryden, Deputy Administrator of the National Aeronautics and Space Administration, with respect to an invention of Ali Javan, Boston, Mass., and Koichi Shimoda, Tokyo, Japan
Filed Oct. 24, 1965, Ser. No. 505,320
Int. Cl. H01s 3/00
U.S. Cl. 331—94.5    12 Claims

ABSTRACT OF THE DISCLOSURE

A scheme for long term frequency stability of an optical maser having a sinusoidally modulated cavity employing closed loop controls including detection of the second derivative of the modulated beam for control of excitation energy, detection of the third derivative for control of average separation and detection of the first derivative for control of tilt angles.

---

The present invention relates generally to optical masers and more particularly to a gaseous optical maser that is frequency stabilized by controlling the position of mirrors in an optically resonant cavity, as well as the maser operating level.

The oscillation frequency, $v$, of a gaseous optical maser, operating in an optical resonant cavity, e.g. a cavity defined by a pair of Fabry-Perot mirrors, is closer to the resonant frequency of the optical cavity, $v_c$, than to the center frequency of the maser gas atomic resonance, $v_m$. For a maser operating close to the oscillation threshold, the first order pulling equation is:

$$\frac{1}{v} = \frac{1}{Q_m + Q_c}\frac{Q_m}{v_m} + \frac{Q_c}{v_c}$$

where $Q_m$ and $Q_c$ are the effective Q factors of the atomic and cavity resonances, respectively. In the near infrared and visible frequency ranges, the Doppler breadth of the atomic transitions within the maser gas are typically much broader than the width of the cavity resonance so that $Q_c$ is much larger than $Q_m$ and the oscillation frequency of a maser in this frequency band is merely proportional to the resonator length. Thus, the frequency stability of the optical maser depends largely on the actual stability of the resonator length, with the center frequency of the maser gas atomic resonance being only a relatively minor factor.

Because a gaseous, optical maser has two resonant elements at approximately the same frequency, its output versus frequency characteristics are those of a double tuned circuit. If the A.C. excitation for the atomic resonance is sufficiently large, a plot of the cavity length versus output power resembles the curves of voltage versus frequency of a double tuned resonant network having tight coupling in which output peaks occur on each side of resonance. Similarly, curves analogous to critical and loose coupling are attained by varying the A.C. excitation of atomic resonance.

At critical coupling, the plot of output power versus cavity length has a zero slope, as well as zero values for the first and second rates of change of slope at the cavity length corresponding with $v_m$, i.e. the first, second and third derivatives of output power versus cavity length are zero at the cavity length corresponding with $v_m$. By stabilizing the optical maser A.C. excitation power so the operating point of the system is at critical coupling, it is possible to derive control signals to maintain the output frequency stable for prolonged time periods, fifteen minutes or more. Stability is achieved by sinusoidally modulating the separation between a pair of dielectric mirrors defining the Fabry-Perot optical resonant cavity. In addition, the relative tilt angles of the mirrors in the two planes at right angles to the cavity longitudinal axis are sinusoidally modulated; modulation in the first plane is at the same relatively low rate as the separation modulation while in the second plane it is at a different, relatively low frequency.

The average separation between the mirrors is maintained constant by detecting the third harmonic of the low frequency modulation imposed on the maser beam by the mirror separation variation. The third harmonic is compared in phase with the third harmonic of the source used to modulate the mirror separation. Because the system is critically tuned, the third harmonic phase comparison provides an error signal indicative of the average difference between the actual mirror separation and the mirror separation corresponding with $v_m$. The absence of a third harmonic component corresponds with a zero third derivative of output power versus cavity length, hence provides an indication that the cavity is tuned.

Stabilization of the optical maser at a power level corresponding with critical coupling is achieved by phase detecting the second harmonic of the sinusoidal mirror separation frequency, as imposed on the detected maser beam, and deriving an error signal that controls the atomic resonance A.C. excitation. A zero second harmonic error signal can be generated only at critical coupling because for all other coupling factors the output versus length characteristic of the system has significant slope rate of change at points slightly removed from the cavity length corresponding with $v_m$.

If the mirrors are not angularly aligned, we have found that output power is a linear function of mirror angle difference. Hence the first harmonics of the two frequencies causing sinusoidal rotation of the mirrors relative to each other are utilized to derive error signals for controlling average mirror angular position.

A feature of the invention, achieved because the atomic maser is critically excited, is that the mirrors are independently moved in the three degrees of motion specified. Independent mirror movement in the three degrees of motion simplifies the apparatus used to drive and control the transducers that rotate and translate the mirrors relative to each other. In fact, if mirror motion in the three degrees of movement is not independent, automatic control of the system may be impossible.

By utilizing the concepts of the present invention, we have found that frequency stability, on both long and short term bases, has been achieved under normal environments. In contrast, most prior art techniques for stabilizing continuous wave, i.e. free running, optical masers have required special laboratory surroundings that provide extreme thermal and acoustical isolation between ambient conditions and the optical cavity. While extremely long term stability is preferably attained utilizing a completely automatic system, it is to be understood that the present invention can also be performed manually, in which case meter readings are observed to control average mirror positions.

It is, accordingly, an object of the present invention to provide a new and improved means and method for stabilizing an optical, gas maser.

Another object of the present invention is to provide a new improved system and method for stabilizing the frequency of a gaseous optical maser on the center frequency of atomic resonance of the gas, whereby relatively long and short term frequency stabilities are achieved.

Another object of the invention is to provide a new and improved system and method for controlling the position of mirrors forming the optical resonator of a gas maser so that the maser oscillating frequency is stabilized on the center of atomic resonance of the gas.

A further object of the invention is to provide a system and method for independently controlling the position, in each of three degrees of motion, of the mirrors forming an optical resonator of a gas maser.

An additional object of the invention is to provide a new and improved system and method for controlling the excitation and output power of an optical gas maser.

Still another object of the invention is to provide a new and improved system and method for controlling the output power of an optical gas maser at a level wherein mirrors forming the optical cavity of the maser can be moved substantially independent of each other in three degrees of motion.

Yet an additional object of the invention is to provide a system and method for controlling independently, in three degrees of motion, the position of mirrors forming the optical resonator of a gas maser so that the maser oscillation frequency is stabilized on the center of atomic resonance of the gas while controlling an output power level of the maser.

Still an additional object of the invention is to provide a new and improved system and method for resetting an optical gas maser to the center frequency of the gas atomic resonance if drift in the maser output frequency occurs.

The above and still further objects, features and advantages of the present invention will become apparent upon consideration of the following detailed description of one specific embodiment of the invention, especially when taken in conjunction with the accompanying drawings, wherein:

FIG. 1 is a perspective view of a gaseous optical maser controlled according to the present invention;

FIGS. 2a and 2b, together, are a block diagram of a preferred embodiment of the control system of the present invention;

Figure 1:
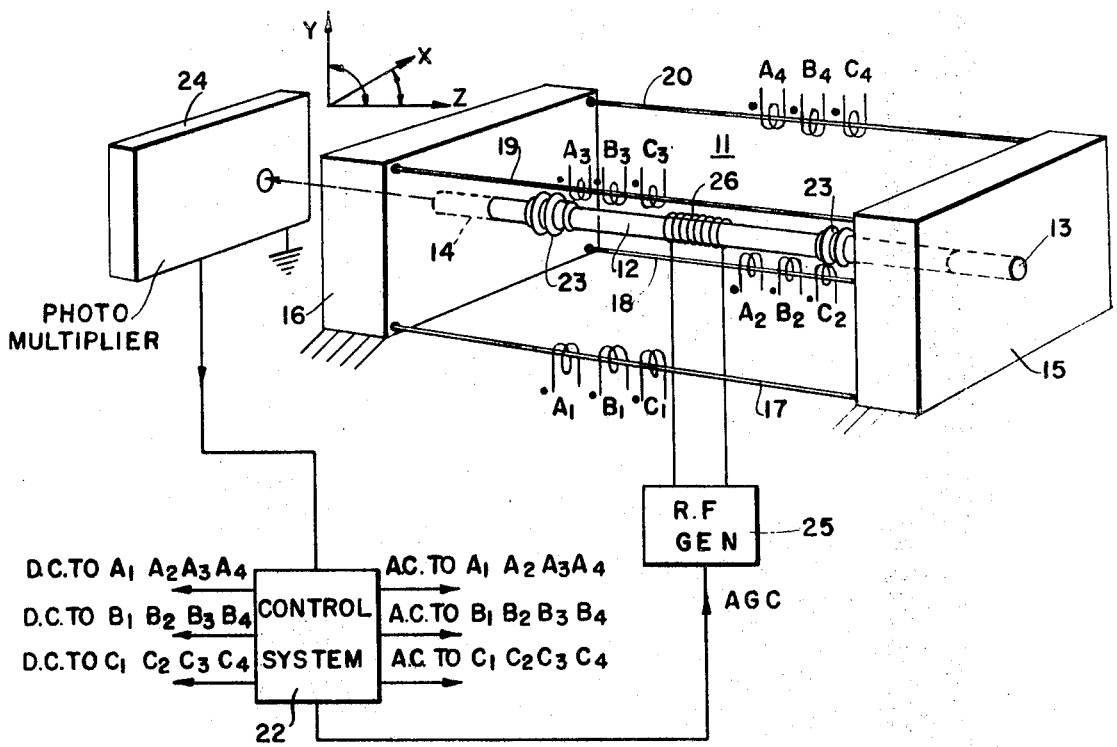

Reference is now made to FIG. 1 of the drawings wherein the optical maser is illustrated as comprising optical cavity 11 and glass tube 12 filled with a mixture of helium and neon, enriched with neon that has an isotopic purity in excess of 99% to eliminate resonate line shape distortion of the 1.15 micron transition that usually occurs in helium neon masers. Hence, the helium neon gas mixture in tube 12 has a completely undistorted line shape at 1.15 microns and coherent emission at this wave length may occur.

Optical cavity 11 comprises Fabry-Perot dielectric mirrors 13 and 14, which are located at either end of tube 12 and are mounted in metal blocks 15 and 16, respectively. Blocks 15 and 16 are preferably fabricated from a temperature stable metal, such as Invar. Blocks 15 and 16 are connected to each other by magnetostrictive bars 17–20, a separate one of which is attached to each corner of the blocks, Each of bars 17–20 is provided with three exciting coils, designated A1, B1, C1 for bar 17, A2, B2, C2 for bar 18, etc. for bars 19 and 20. The coils on bars 17–20 are wound in the direction indicated on the drawing by the dot convention. Coils A1–A4 translate blocks 15 and 16, hence mirrors 13 and 14, relative to the longitudinal axis of tube 12 while coils B1–B4 and C1–C4 are wound so that mirrors 13 and 14 are rotated relative to each other in the two planes at right angles to the length of tube 12. Thus, coils B1–B4 rotate mirrors 13 and 14 in the YZ plane while coils C1–C4 rotate the mirrors in the XZ plane.

Both A.C. and D.C. currents are supplied to the coils by signals deriving from control system 22. The A.C. currents are of constant amplitude to sinusoidally modulate the relative separation and tilt angles of mirrors 13 and 14 about average values fixed by the D.C. currents. As seen infra, the A.C. currents are of relatively small magnitude but are sufficiently great in amplitude to cause amplitude modulation of the maser beam generated in response to the atomic resonance of the gases in tube 12. To enable glass tube 12 to move with mirrors 13 and 14 that form the tube ends, sylphon bellows 23 form a section of the tube toward each of the ends thereof.

Dielectric mirrors 13 and 14 are of the usual very high reflectivity, low loss type in which approximately 0.6% of the energy impinging on the latter is transmitted through it. The coherent optical light transmitted through mirror 14 strikes photomultiplier 24, from which is generated a signal having frequency components corresponding with the frequencies utilized to excite coils A1–A4, B1–B4, and C1–C4. In addition, the photomultiplier output includes harmonics of the coil A.C. excitation frequencies because of nonlinearities in the maser output in response to the mechanical motion imposed on mirrors 13 and 14, as well as the nonlinearities of the amplifier circuit included within photomultiplier 24.

Control system 22 responds to the A.C. signals generated by photomultiplier 24 to derive control signals for the average separation and titlt angles of mirros 13 and 14. In addition, control system 22 generates a D.C. voltage to establish the output level of 30 megacycle radio frequency generator 25. Generator 25 excites the helium neon mixture in tube 12 into maser oscillation in the single axial mode via electrodes 26 that are secured to the tube in the usual manner. While automatic control of the average separation and tilt angles of mirrors 13 and 14, as well as of the R.F. generator output is preferred for a system having long term stability, it is to be understood that the A.C. outputs of system 22 can be monitored visually, from which visual monitoring manual control can be effected.

Figure 2A:
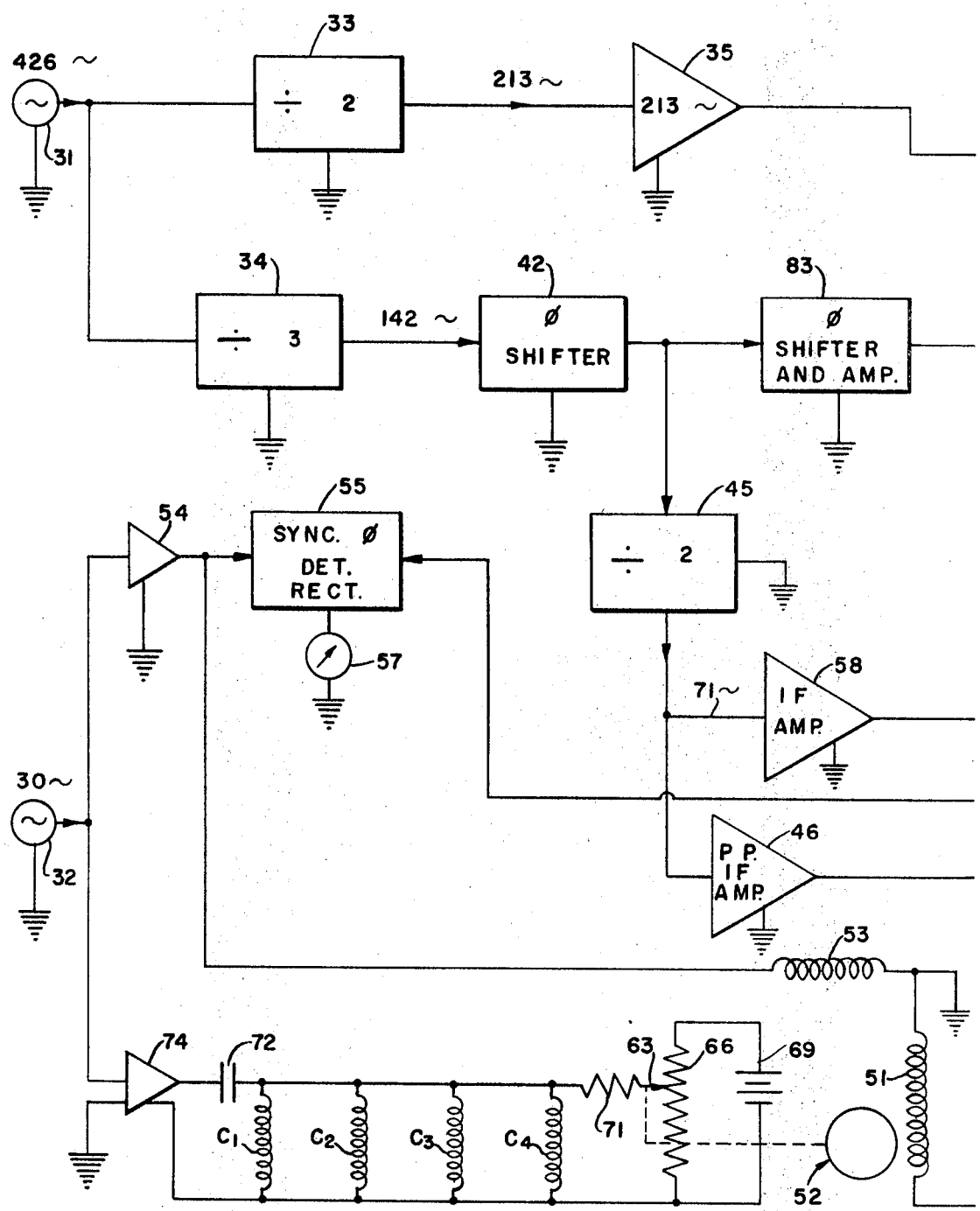
Figure 2B:
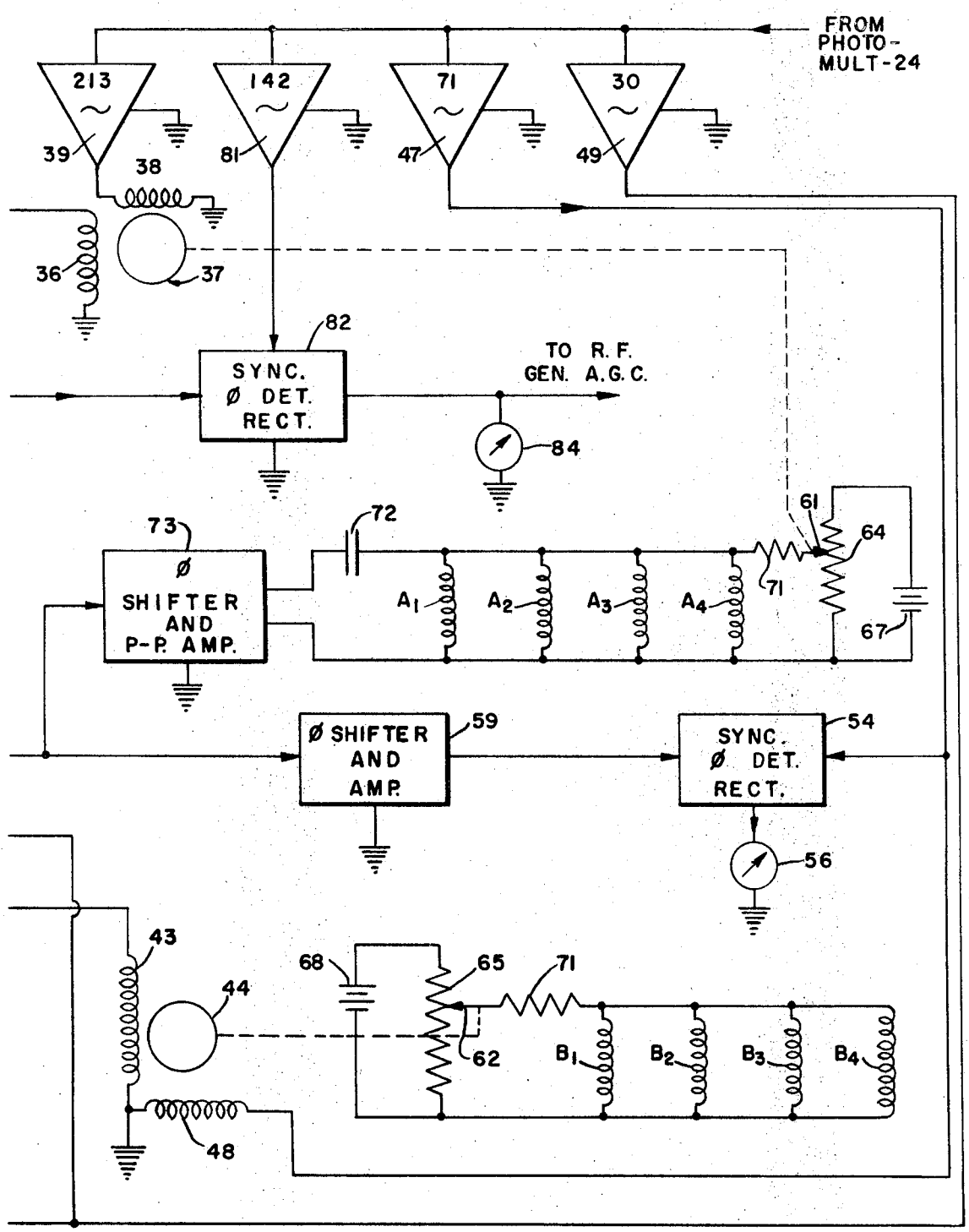

Reference is now made to FIGS. 2A and 2B of the drawings, a schematic diagram of a preferred embodiment of control circuit 22, wherein 426 cycle-per-second and 30 cycle-per-second A.C. power sources 31 and 32 are provided. The A.C. voltage derived from source 31 is frequency divided by frequency dividers 33 and 34, whereby frequencies of 213 cycles per second and 142 cycles per second are generated. The A.C. output of frequency divider 33 is filtered by driver 35 so that a 213 cycle wave, having low harmonic content and reference phase, is applied to winding 36 of servomotor 37. Winding 38 of the two phase motor 37, at right angles to winding 36, is driven by filtering amplifier 39, that passes 213 cycles-per-second components deriving from photomultiplier 24. Thereby, rotation of output shaft of servomotor 37 is clockwise or counterclockwise depending upon the relative phase of the signal applied to winding 38.

The 142 cycle per second output of frequency divider 34 is phase shifted by circuit 42, the output of which is supplied to winding 43 of the two-phase motor 44 via divide-by-two frequency divider 45 and filtering, driver amplifier 46. Thereby, a relatively harmonic free A.C. wave of 71 cycles per second is supplied to winding 43 to be phase compared with the 71 cycle per second output of photomultiplier 24, as coupled through filtering, driver amplifier 47 to winding 48. In a similar manner, the 30 cycle per second component derived from photomultiplier 24 is coupled through filtering amplifier 49 to winding 51 of motor 52 to be phase compared with the 30 cycle per second reference phase signal fed to winding 53 through driver amplifier 54 from source 32. The phase comparisons made by motors 44 and 52 can also, or alternatively, be effected with synchronous phase detecting rectifiers 54 and 55, the D.C. outputs of which feed voltmeters 56 and 57 that can be visually observed. To provide detector 54 with a reference input of proper phase and amplitude, the 71 cycle per second output of frequency divider 45 is fed through filtering amplifier 58 that is cascaded with phase shifter and amplifier 59.

The output shafts of motors 37, 44, and 52 drive wiper arms 61–63 of potentiometers 64–66, respectively. Each of potentiometers 64–66 is connected across a D.C. voltage source, shown in the drawing as batteries 67–69. Each of the coil sets A1–A4, B1–B4, and C1–C4 is supplied in parallel from arms 61–63 through a separate current limiting resistor 71 with a different D.C. voltage that is varied as a function of the 213 cycle per second, 71 cycle per second and 30 cycle per second outputs of photomultiplier 24.

Coil sets A1–A4 and C1–C4 are supplied with A.C. reference phase currents of frequencies 71 cycles per second and 30 cycles per second through coupling capacitors 72 by phase shifter amplifier 73 and driver amplifier 74, respectively. Phase shift amplifier 73 is required between the output of filtering amplifier 58 and coils A1–A4 to drive those coils with the phase necessary to achieve mirror oscillation, whereby system stability occurs.

The frequencies for the sources driving coils A1–A4 and C1–C4 are slected as 30 cycles per second and 71 cycles per second to avoid large phase shifts and hysteresis effects in driving rods 17–20; in addition, these frequencies are relatively immune to noise from 60 cycle power sources.

The A.C. voltages applied to coils A1–A4 sinusoidally translate at 71 cycles per second mirrors 13 and 14 relative to the axis of tube 12 about an average separation determined by the setting of wiper 61. Since wiper 61 is driven by the output of motor 37, the average separation between mirrors 13 and 14 is thus a function of the third harmonic of the source sinusoidally translating the two mirrors relative to the longitudinal axis of optical cavity 11. As is well known, the third harmonic component of a sinusoidal function is related to the third derivative of the function so that the average separation of mirrors 13 and 14 is directly related with the third derivative of maser beam power versus the length of resonant cavity 11.

In a somewhat similar manner, the A.C. voltage applied to coils C1–C4 causes the tilt angle between mirrors 13 and 14 to be varied in the XZ plane at 30 cycles per second about an average point determined by the setting of wiper arm 63. Since the position of wiper arm 63 is controlled by a phase comparison of the 30 cycle per second fundamental deriving from photomultiplier 24, the average angular position of mirrors 13 and 14 in the XZ plane is a direct function of the first derivative of mirror tilt angle in the XZ plane versus power output.

Sinusoidal modulation of the angles of mirrors 13 and 14 in the YZ plane is under the control of the 71 cycle per second A.C. voltage applied to windings A1–A4 because windings A3 and A4 are provided with a greater number of turns than windings A1 and A2. Thereby, upper magneto-strictive rods 19 and 20 are driven with greater amplitude than the lower rods 17 and 18 and tilt angle of mirrors 13 and 14 in the YZ plane is sinusoidally modulated at 71 cycles per second.

Average angular position control of mirrors 13 and 14 in the YZ plane is quite similar to average angular position control in the XZ plane, except that control in the YZ plane is responsive to the fundamental of the 71 cycle per second photomultiplier output, as reflected in the D.C. input voltage to coils B1–B4.

To control the excitation level of atomic resonance of the helium neon gas mixture in tube 12, the 142 cycle per second component detected by photomultiplier 24 is filtered by amplifier 81. The output of amplifier 81, corresponding with the second harmonic of the 71 cycle per second cavity length modulation, is phase compared by sychronous phase detector and rectifier 82 with the 142 cycle per second reference phase sinusoid deriving from phase shifter 83, that is responsive to the output of phase shifter 42. The D.C. voltage generated by phase detector 82, a linear function of the difference in phase of its two inputs, is applied as an automatic gain control signal to radio frequency generator 25 and to D.C. voltmeter 84. The D.C. output of detector 82 maintains the maser atomic resonance excitation at the level where critical coupling between the atomic and cavity resonances occurs. If coupling is greater that critical, a positive 142 cycle per second error signal is derived from amplifier 81 to reduce the maser excitation R.F. signal output of generator 25, while the opposite result occurs when coupling is less than critical.

To provide a more complete and better understanding of the manner in which the present invention functions, reference is now made to FIGS. 3–6 of the drawings. It can be shown, both mathematically and physically, that power output as a function of optical cavity length, i.e. separation distance between mirrors 13 and 14, for the maser disclosed herein comprises a series of curves 85–89, FIG. 3. The similarity between curves 85–89 and the response of a double tuned resonant network should be noted. As in the case of a double tuned resonant network, maser response is a function of coupling between a pair of resonant elements, namely between a helium neon gas atomic resonance and the cavity resonance.

Coupling in the case of the maser is dependent upon excitation level of the helium neon gas, hence output power of R.F. generator 25. In response to the helium neon gas being excited with a high power output from generator 25, the maser output versus cavity length is a series of double humped curves, such as curves 85 and 86, which have a minimum at the cavity length that provides optical resonance for the coherent stimulated emission from the helium neon gas, i.e. at the cavity critical length. When the optical maser gas in under excited in response to the output of generator 25, the system output comprises a series of single peaked curves, such as 88 and 89, having maximums at the cavity critical length, from which maximums the power levels fall rapidly. Thus, curves 85, 86 and 88, 89 are analogous to the over coupled and under coupled double tuned networks, respectively.

Immediately between the under and over coupled conditions, is curve 87 that represents system response when the helium neon gas in tube 12 is excited so that critical coupling occurs. At the cavity critical length, curve 87 has the unique property that its first, second and third derivatives are all zeros. Since it can be shown that these derivatives are all zero only at point 91, where critical coupling at critical length occurs, the maser can be controlled to reach point 91, and the control can determine if operation is occuring at any other point on the response curve of the system. In other words, a peak on curve 85 or 86 can not be misconstrued as being at critical cavity length. Another advantage of operating a maser at point 91 is that movement of mirrors 13 and 14 in the three degrees of motion specified, i.e. along the cavity or Z axis, rotation in the YZ plane and rotation in the XZ plane, is independent. In the system of the present invention, the zero values of the first, second and third derivatives of power output versus cavity length are reflected as zero outputs from filtering amplifiers 47, 81 and 39, that respectively pass the first, second and third harmonics of the amplitude modulation imposed on the maser beam output in response to sinusoidal modulation of the separation of mirrors 13 and 14 at 71 cycles per second.

Figure 5A:
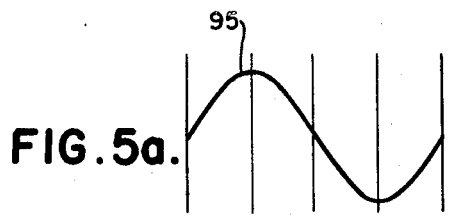
FIG. 5 shows wave forms derived to control mirror separation.
Figure 5B:
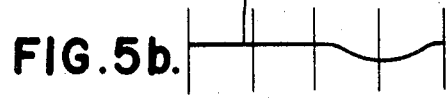

To provide an understanding of the manner in which the third harmonic deriving from photomultiplier 24 provides length control, assume: (1) the neon gas is excited to critical coupling, so operation is on curve 87; (2) the average separation between mirrors 13 and 14 is greater than critical cavity length and is at point 92; and (3) the separation between mirrors 13 and 14 is sinusoidally modulated about point 92 between points 93 and 94 by 71 cycle per second sinusoid 95, FIG. 5A. During the first half cycle of wave form 95, mirrors 13 and 14 move closer to each other, between points 92 and 93. Because curve 87 is extremely linear between these points, due to its first, second and third derivatives all being equal to zero, the maser beam amplitude is not modulated by the mirror change in the separation. During the second half cycle of wave form 95, however, when the separation between mirrors 13 and 14 varies between points 92 and 94, there is a decrease in the maser beam power output level. In consequence, over a complete cycle of the 71 cycle per second modulation imposed on the separation between mirrors 13 and 14, wave form 96, FIG. 5B is derived.

Figure 5C:
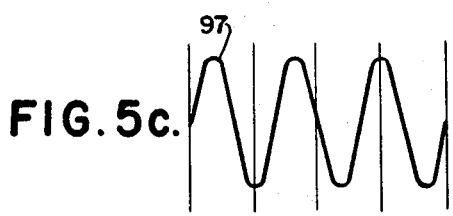
Figure 5D:
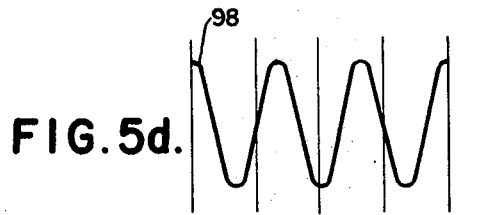

Because the second half cycle of wave 96 is of lower amplitude than the constant amplitude first half cycle thereof, the wave is rich in third harmonic content. In consequence, a third harmonic sinusoid 97, of relatively large magnitude, as illustrated in FIG. 5C, is derived from amplifier 39. Sinusoid 97 is phase compared with the third harmonic reference sinusoid 98, FIG. 5A, in motor 37. The relative phases of the voltages applied to windings 36 and 38 of motor 37 are such as to rotate the motor shaft in a direction to reduce the D.C. voltage at tap 61 and cause the average separation between mirrors 13 and 14 to be translated toward point 91.

Figure 5E:
Figure 5F:
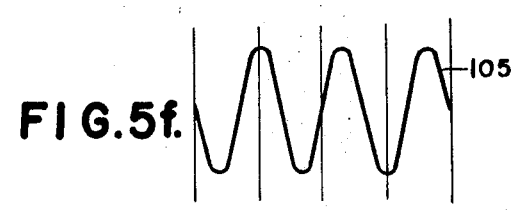

If the opposite conditions prevail, whereby the average mirror separation is less than critical cavity length, as at point 101, operation is as follows: during the first half cycle of wave form 95, the cavity length varies between points 101 and 102, whereby a decrease in the maser output power level occurs, as reflected by wave form 103, FIG. 5E. During the second half cycle, however, mirrors 13 and 14 are driven farther apart, between the points 101 and 104 where the response curve is linear. Thus, considerable third harmonic content is found in the output of the photodetector 24. The third harmonic content is, however, now of opposite phase angle relative to the third harmonic content derived when operation was centered about point 92, as seen from wave form 105, FIG. 5F.

In response to the phase comparison of wave forms 98 and 105, applied to windings 36 and 38, respectively of servomotor 37, wiper arm 61 is activated to provide increased D.C. voltage to coils A1–A4, whereby the average separation between mirrors 13 and 14 is increased toward point 91. Of course, if the average separation of mirrors 13 and 14 corresponds with critical cavity length, no third harmonic components are derived from amplifier 39 and wiper 61 remains in situ because the maximum mirror separation imposed by the 71 cycle per second modulation is not sufficient to cause a detectable decrease in the maser output power.

Figure 3:
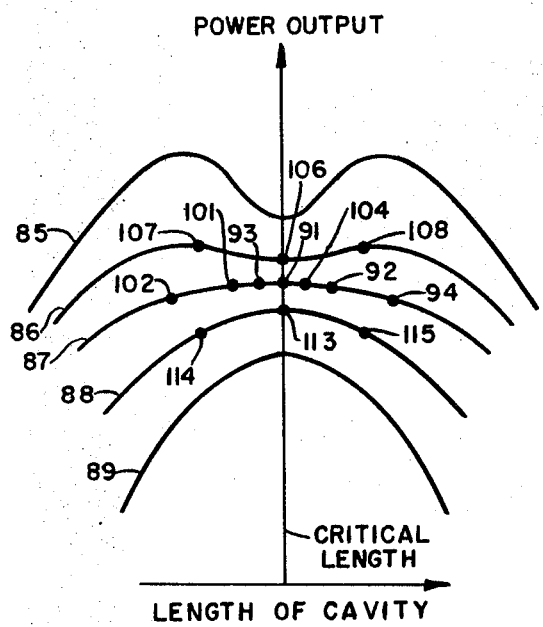
FIG. 3 is a plot of power output versus length of cavity.

FIG. 3 is also helpful in providing an understanding of the manner in which R.F. generator 25 maintains the helium neon gases in tube 12 excited so critical coupling occurs. In discussing the manner in which the maser is excited to a point where critical coupling occurs, it is assumed that the average mirror separation corresponds with critical cavity length and that source 25 generates a R.F. voltage to excite the atomic resonance so that over coupling between the atomic and cavity resonance is effected; hence, system operation can be assumed to be on curve 86 and about point 106.

Figure 6A:
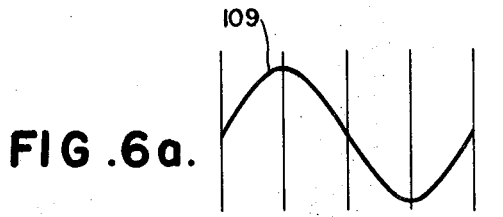
FIG. 6 shows wave forms derived to control the level of the R.F. exciting source for the maser.
Figure 6B:
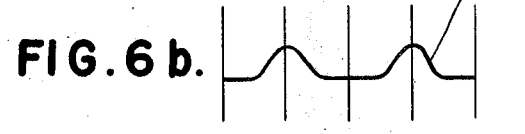
Figure 6C:
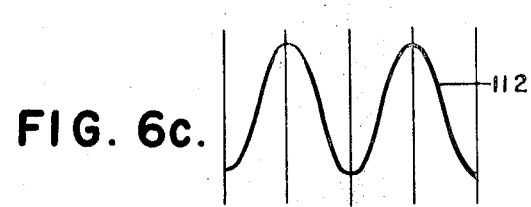
Figure 6D:
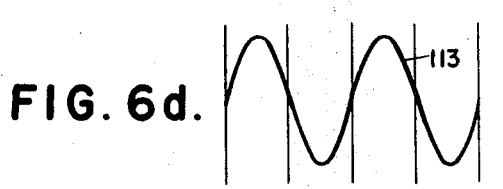
Figure 6E:
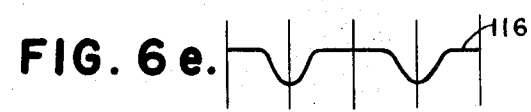

During the first half cycle of the 71 cycle per second modulation imposed on the separation of mirrors 13 and 14, as indicated by sinusoid 109, FIG. 6A, maser output power increases from point 106 to point 107 and returns to the latter point, while during the second half cycle, the maser output power increases to point 108. Hence, during both the first and second half cycles of the 71 cycle per second modulation, there are positive excursions in the maser output power, as indicated by wave form 110, FIG. 6B.

Because wave form 110 includes a pair of positive peaks during each cycle of wave form 109, it is seen that wave form 110 is rich in second harmonic content of wave 109. The relatively large second harmonic component, at 142 cycles per second, is filtered by amplifier 81 which derives wave 112, FIG. 6C. Wave 112 is applied by amplifier 81 as one input to phase detector 82 that is also supplied with a 142 cycle per second wave of reference phase by phase shifter and amplifier 83, the output of phase shifter and amplifier 83 being indicated by wave form 113, FIG. 6D. In response to the relative phase difference of the two points applied thereto, phase detector 82 derives a negative D.C. voltage that reduces the output of radio frequency generator 25 toward critical coupling curve 87.

Figure 6F:
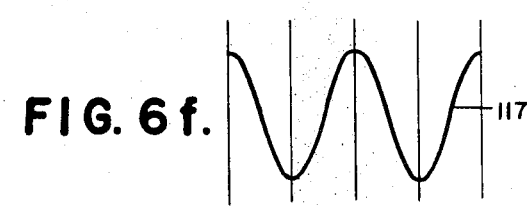

If, on the other hand, coupling between the cavity and atomic resonances is below critical and operation is on curve 88, e.g. decreases in the maser output power occur during both the first and second half cycles of wave 109. In response to the sinusoidal mirror separation at 71 cycles per second, system output power falls from point 113 to point 114 during the first half cycle of wave 109 and to point 115 during the second half cycle of the modulating wave; resulting in an amplitude modulated maser output beam, as indicated by wave 116, FIG. 6E. When wave 116 has been passed through amplifier 81, wave shape 117, FIG. 6F is derived and imposed on one input of phase detector 82. Since wave 116 is of opposite phase relative to wave 112, detector 82 now derives a positive output to increase the excitation supplied by source 25 to the helium neon gas maser. With the maser excited to critical coupling, in the vicinity of critical length, there is insufficient second harmonic content in the signal deriving from photomultiplier 24 to change the output level of detector 82.

Figure 4:
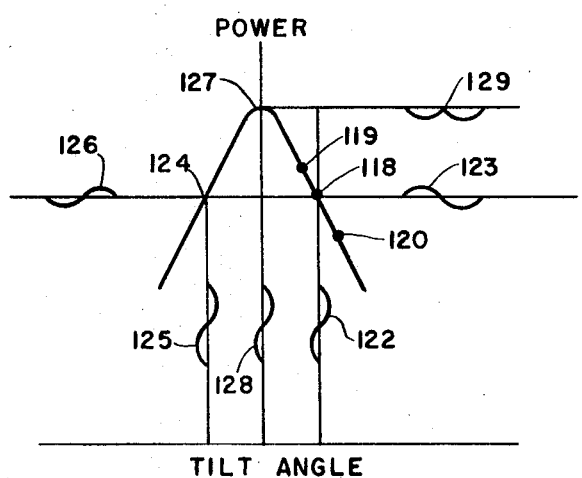
FIG. 4 is a plot of power output versus mirror angular position for a number of different output power levels.

Control of mirrors 13 and 14 for angular alignment in the YZ and XZ planes is best understood by an inspection of FIG. 4. From FIG. 4, which represents a plot of output power versus mirror angular position in each of the YZ and XZ planes at critical length, it is seen that approximately straight line functions occur in the vicinity of alignment, i.e. where the relative mirror angles are zero. If mirrors 13 and 14 are not aligned, the maser output level is always less than the peak value occurring at alignment. In consequence, the first derivative of power output can be employed for tilt angle control between mirrors 13 and 14. The first derivative is obtained in the preferred embodiment of the apparatus of the present invention by deriving an indication of the fundamental components of the maser beam amplitude at the two frequencies for which the tilt angle modulation of mirrors 13 and 14. These two fundamentals are phase compared with reference phases at each of the two frequencies, 71 cycles per second and 30 cycles per second, in motors 44 and 52, respectively.

To provide an understanding of tilt angle control, it is initially assumed that the average relative position of mirrors 13 and 14 in the YZ plane is indicated by point 118 and that the 71 cycle per second angular modulation causes rotation of the mirrors between points 119 and 120. The 71 cycle per second modulation, indicated by sinusoid 122, results in amplitude modulation of the maser beam output shown by wave form 123 that has a relatively large fundamental, 71 cycle per second component. A reference phase signal at 71 cycles per second and the fundamental of wave form 123, as coupled through filtering amplifier 71, are phase compared by motor 44. The output shaft of motor 44 is rotated to decrease the voltage at slider 65 and thereby decrease the average angular separation between mirrors 13 and 14. In a similar, but opposite manner, if the average separation between mirrors 13 and 14 is on the other side of alignment, at point 124 for example, sinusoidal modulation 125 results in maser beam amplitude modulation as shown by wave 126.

It is noted that waves 123 and 126 are of approximately the same sinusoidal shape since they both are responses from the linear portion of the power output curve of FIG. 4, but that they are of opposite phase. In consequence, with mirror rotation centered about point 124, slider 62 is driven upwardly to provide a larger driving voltage for coils B1–B4 and thereby increase the average angular separation between mirrors 13 and 14.

If mirrors 13 and 14 are properly aligned in the YZ plane, operation is about point 127, FIG. 4. In response to the 71 cycle per second source angularly modulating the position of mirrors 13 and 14 in the YZ plane, the maser beam is amplitude modulated as indicated by wave form 128. Because the response characteristic of output power versus mirror angle is a linear function, wave form 129 is essentially a full wave rectified version of the 71 cycle per second modulating source. In consequence, there is very little fundamental component in wave form 129, and the output of filtering amplifier 47 is considered as nil. Thereby, the positions of motor 44 and wiper arm 62 remain stationary and the average relative angle between mirrors 13 and 14 is unchanged.

Since the curves of output power versus mirror separation angle are approximately the same for the XZ and YZ planes, motor 51 drives wiper arm 63 in the same manner as motor 44 drives arm 65. The difference, of course, is that motor 51 is excited with 30 cycle per second inputs, the frequency at which mirrors 13 and 14 are rotated in the XZ planes.

While we have described and illustrated one specific embodiment of our invention, it will be clear that variations of the details of construction which are specifically illustrated and described may be made without departing from the true spirit and scope of the invention as defined in the appended claims.

We claim:

1. A system for stabilizing the frequency of an optical maser to a frequency corresponding with atomic resonance, said maser including an optical resonant cavity having a pair of mirrors and means for translating said mirrors relative to the cavity longitudinal axis and for rotating said mirrors in the two planes at right angles to said longitudinal axis, comprising means for activating said translating and rotating means to sinusoidally modulate the separation and tilt angles of said mirrors, means for detecting the amplitude modulation imposed on the maser output by said sinusoidal modulations to provide a first indication of the third derivative of maser output level versus mirror separation, a second indication of the first derivative of maser output level versus mirror angle in one of said planes, and a third indication of the first derivative of maser output level versus mirror angle in the second of said planes, and means for controlling the average separation and tilt angles between said mirrors, said means for controlling being responsive to said first, second and third indications.

2. A system for controlling the output power of an optical maser, said maser including an optical resonant cavity having a pair of mirrors and means for translating said mirrors relative to the cavity longitudinal axis, comprising means for activating said translating means to sinusoidally modulate the separation of said mirrors, means for detecting the amplitude modulation imposed on the maser output by said sinusoidal modulation to provide an indication of the second derivative of maser output level versus mirror separation, and means for controlling the excitation of atomic resonance to maintain critical coupling between the atomic and cavity resonances, said means for controlling the excitation being responsive to said indication of the second derivative of maser output level versus mirror separation.

3. A method for stabilizing the frequency of an optical maser to a frequency corresponding with atomic resonance, said maser including an optical resonant cavity having a pair of mirrors, comprising the steps of translating and rotating said mirrors to sinusoidally modulate: the separation along the cavity plane at frequency $F_1$, the tilt angle of said mirrors in a first plane at right angles to said axis at a frequency $F_1$ and the tilt angle of said mirrors in a second plane at right angles to said axis at a frequency $F_2$; detecting the $F_1$, $F_2$, and $3F_1$ components imposed on the maser output by said sinusoidal modulations, controlling the average separation between said mirrors, along said axis, to substantially eliminate the $3F_1$ component in said maser output, controlling the tilt angle in the first of said planes to substantially eliminate the $F_1$ component in said maser output, and controlling the tilt angle of said mirrors in the second of said planes to substantially eliminate the $F_2$ component in the maser output, further including the step of detecting $2F_1$ components imposed on the maser beam output as a result of said sinusoidal modulation, and controlling the excitation of atomic resonance so that said $2F_1$ components are substantially removed from the maser output, whereby critical coupling between the atomic and cavity resonances is established.

4. A method for controlling the output power of an optical maser, said maser including an optical resonant cavity having a pair of mirrors, comprising the steps of sinusoidally translating said mirrors along the longitudinal axis of said cavity at a frequency $F_1$, detecting the $2F_1$ modulation imposed on the maser output by said sinusoidal modulation, and adjusting the maser excitation level to substantially eliminate the $2F_1$ component in the maser output, whereby critical couplind between the atomic and cavity resonances is established.

5. A system for stabilizing the frequency of an optical maser to a frequency corresponding with atomic resonance, said maser including an optical resonant cavity having a pair of mirrors and means for translating said mirrors relative to the cavity longitudinal axis, comprising means for activating said translating means to sinusoidally modulate the separation of said mirrors at a frequency $F_1$, means for detecting the $3F_1$ components imposed on the maser output by said sinusoidal modulation, a source of voltage having frequency $3F_1$ and reference phase, means for comparing the detected $3F_1$ component with the voltage of reference phase to derive an error signal, and means for controlling the average separation between said mirrors to substantially reduce the $3F_1$ component in the maser output, said means for controlling being responsive to said error signal.

6. A system for stabilizing the frequency of an optical maser to a frequency corresponding with atomic resonance, said maser including an optical resonant cavity having a pair of mirrors and means for translating said mirrors relative to the cavity longitudinal axis and for rotating said mirrors in first and second planes at right angles to said longitudinal axis, comprising means coupled to said translating means to activate sinusoidal modulation of the separation between said mirrors at frequency $F_1$ and to activate sinusoidal modulation of the angle between said mirrors in one of said planes at frequency $F_1$; means coupled to said rotating means to activate sinusdoidal modulation of the other angle of said mirror at a frequency $F_2$; means for detecting the $F_1$, $F_2$ and $3F_1$ components imposed on the maser output by said sinusoidal modulations; a first, second and third voltage sources of reference phase at frequencies $F_1$, $F_2$ and $3F_1$, respectively; means for phase comparing said first, second and third voltage sources with said detected $F_1$, $F_2$ and $3F_1$ components, erspectively, to derive first, second and third error signals; means for controlling the average tilt angle between said mirrors in said first plane to substantially reduce the detected $F_1$ component to zero, said means for controlling average tilt angle in said first plane being responsive to said first error signal, means for controlling the average tilt angle between said mirrors in the second of said planes to substantially reduce the detected $F_2$ component to zero, said means for controlling average tilt angle between, mirrors in said second plane being responsive to said second error signal, and means for controlling the average separation between said mirrors to substantially reduced the detected $3F_1$ component to zero, said means for controlling average separation being responsive to said third error signal.

7. The system of claim 6 further including means for detecting $2F_1$ components imposed on the maser output by said sinusoidal modulation, a fourth voltage source of frequency $2F_1$ and reference phase, means for phase comparing the detected $2F_1$ component with the fourth reference voltage to derive a fourth error signal, and means for controlling the excitation of said maser to maintain critical coupling between the atomic and cavity resonances and thereby substantially eliminate the $2F_1$ detected components, said means for controlling the excitation of said maser being responsive to said fourth error signal.

8. In a system for stabilizing the output frequency of an electromagnetically excited radition emissive device to a frequency corresponding with atomic resonance, said device including a resonant cavity having a pair of reflectors and a means for translating said reflectors relative to said cavity longitudinal axis, said means for translating including means to control average separation and means to oscillate said reflectors resulting in a modulation of the output emission of said device, the improvement comprising, (a) means for sensing the amplitude modulation of said output emission of said device, said modulation being a function of the characteristic response of said device to oscillatory translation of one of said reflectors relative to the other said reflector; (b) means for providing an indication of the second derivative of said modulated output emission of said device, said means for sensing the amplitude modulation of said output of said device being coupled to said means for providing an indication of the second derivative of said modulated output of said device; (c) means for controlling the power of electromagnetic excitation of said device, said means for controlling the power of electromagnetic excitation being responsive to said indication of the second derivative of said modulated output emission of said device, whereby said electromagnetic power excitation controlling means maintains critical coupling between atomic and cavity resonances.

9. The system of claim 8 including (a) means for providing an indication of the third derivative of said modulated output emission of said device, said means for sensing the amplitude modulation of said output of said device being coupled to said means for providing an indication of the third derivative of said modulated output emission of said device; (b) means coupling said indication of said third derivative to said means to control the average separation between said reflectors whereby said average separation is controlled to thereby minimize said third derivative.

10. In a system for stabilizing the output frequency of a laser to a frequency corresponding with atomic resonance, said laser including an optical resonant cavity having a pair of mirrors and means for translating said mirrors relative to the cavity longitudinal axis and for rotating said mirrors relative to said longitudinal axis, the improvement comprising means for activating said translating and rotating means to sinusoidally modulate the relative separation and tilt angle of said mirrors at a frequency $F_1$, means for detecting the amplitude modulation imposed on the laser output by said sinusoidal modulation to provide a first indication of the laser output at frequency $2F_1$, and means for controlling the excitation of said resonant cavity to maintain critical coupling between the atomic and cavity resonances, said means for controlling excitation of said resonant cavity being responsive to said first indication of laser output at frequency $2F_1$.

11. The system of claim 10 wherein said means for detecting includes means for providing a second and third indication, said second and third indication being the $3F_1$ and $F_1$ content in the laser output; said means for translating and rotating said mirrors further comprising means for controlling the average separation and average tilt angle between said mirrors, said means for controlling the average separation and average tilt angle being responsive to said second and third indication respectively.

12. A method for stabilizing the output frequency of an electromagnetically excited radiation emissive device to a frequency corresponding with atomic resonance, said device including a resonant cavity having a pair of reflectors axially separated along a longitudinal axis of said cavity, said method including the steps of: (a) periodically translating the separation between said reflectors along said cavity longitudinal axis thereby causing amplitude modulation of the output radiation of said device; (d) detecting the amplitude modulation of said output radiation of said device and providing an indication of the second derivative of said output radiation with respect to reflector separation; (c) controlling the power of the electromagnetic excitation of said resonant cavity so that the second derivative component is substantially removed from said modulated output radiation of said device.

References Cited

UNITED STATES PATENTS 3,252,110  5/1966  Gustafson et al. _____ 331—94.5

OTHER REFERENCES

"Wave-Length Stabilization of an Optical Maser," Rowley and Wilson, Nature, vol. 200, No. 4908, Nov. 23, 1963, pp. 745–747.

RONALD L. WIBERT, Primary Examiner

V. P. McGRAW, Assistant Examiner